No. 858,050. PATENTED JUNE 25, 1907.
F. J. ZIEGLER.
SPEED CHANGING MECHANISM FOR AUTOMOBILES.
APPLICATION FILED FEB. 27, 1907.
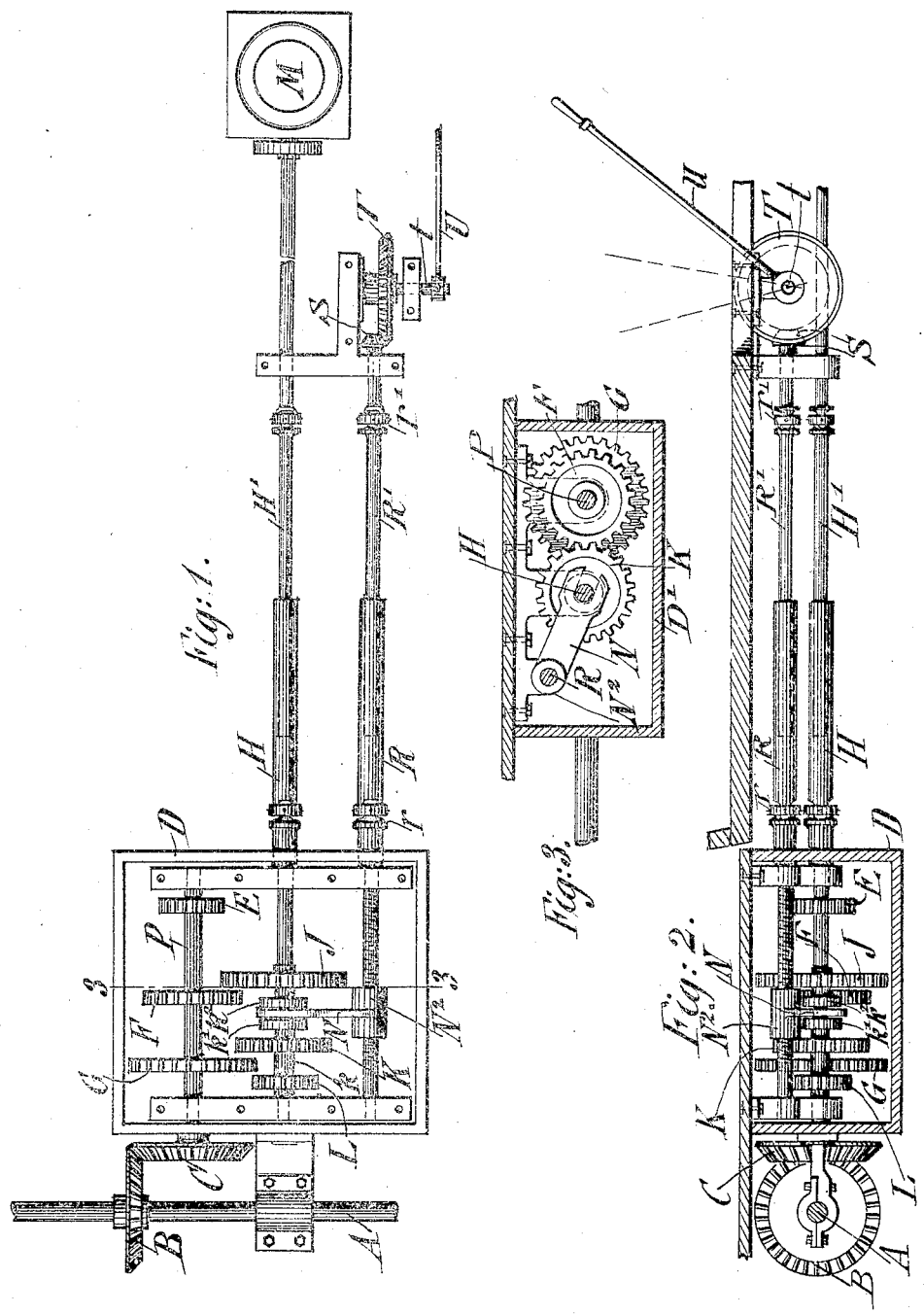
Witnesses
Inventor
Frederick J. Ziegler
By his Attorneys

UNITED STATES PATENT OFFICE.

FREDERICK J. ZIEGLER, OF NEW YORK, N. Y.

SPEED-CHANGING MECHANISM FOR AUTOMOBILES.

No. 858,050.

Specification of Letters Patent.

Patented June 25, 1907.

Application filed February 27, 1907. Serial No. 359,586.

*To all whom it may concern:*

Be it known that I, FREDERICK J. ZIEGLER, a citizen of the United States, residing in New York, in the borough of Manhattan and State of New York, have invented certain new and useful Improvements in Speed-Changing Mechanisms for Automobiles, of which the following is a specification.

In certain speed-changing mechanisms for automobiles as at present constructed, the speed-changing gears are supported from the rear axle and are operated by means of a longitudinally-movable lever-operated rod mounted on the body of the car. It has been found that owing to the up-and-down movement of the car-body on the springs when the car is in motion the lever-operated rod referred to will not cause the gears of the speed-changing mechanism to properly mesh with each other, this being due to the variation in the longitudinal movement of the operating rod. Under these conditions it is impossible to ascertain, when the operating lever is in a predetermined position, what relation the gears bear to each other, and accordingly this arrangement of the speed changing mechanism is unreliable and unsatisfactory.

The present invention aims to obviate the above defects and to provide a speed-changing mechanism in which the shifting movement of the gears is produced in such a manner that the positions of the operating lever and of the gears exactly correspond irrespective of the movement of the car-body on the springs. To this end I provide a gear-shifting fork which is shifted by the rotation of an operating shaft which is formed of telescoping sections, so that the rotation of said rod and consequently the shifting of the gears will not be affected by the difference in the relative positions of the speed-changing gears and the operating lever.

The novel features of the invention will now be described and then recited in the appended claims.

In the accompanying drawings, in which the same reference characters denote the same parts throughout the several views, Figure 1 is a plan view of a speed-changing mechanism constructed in accordance with the invention, the car-body being removed in order to show the gear-shifting mechanism, Fig. 2 is a side elevation of the mechanism shown in Fig. 1, and Fig. 3 is a transverse section on line 3—3, Fig. 1.

In the drawings M denotes the motor of the automobile, which is supported at the front of the same in the usual manner.

A denotes the rear axle. Connection is made between the motor and rear axle by means of a driving shaft composed of two telescopic keyed sections H, H¹, the section H extending into the casing D of the speed changing mechanism in the usual manner. Upon the motor-shaft are arranged gears J, K, L, adapted to be shifted longitudinally into mesh with corresponding gears E, F, G, mounted on a stud-shaft P. Said stud-shaft P carries at one end a beveled gear C, which meshes with a second beveled gear B mounted on the rear axle A. The parts so far described are of well known construction.

The invention consists particularly in the mechanism for shifting the gears on the motor-shaft relatively to those on the stud-shaft. The gears J, K, L are mounted upon a sleeve $k$, which is keyed to but slidable along the section H of the motor-shaft within the casing D. This sleeve is formed with two parallel collars $k^1$, $k^2$, between which a shifting fork N engages. The shifting fork is shifted longitudinally within the gear-casing in order to properly actuate the motor-shaft gears, by means of an operating shaft R, R¹, which, like the motor shaft, is composed of two telescopically-arranged keyed sections. Within the gear-casing D the section R of said operating shaft is threaded, as shown, and said threaded portion engages a threaded extension $N^2$ of the shifting fork N so that said fork is moved longitudinally in the gear-casing in a direction corresponding to that in which the operating shaft is rotated.

The forward section R¹ of the extensible operating shaft is journaled in the car frame as shown in Fig. 1, and is provided at its forward end with a small beveled gear S. Meshing with said beveled gear is a second beveled gear T, mounted upon a stud-shaft $t$. The shaft of the beveled gear T has applied to one end thereof a lever U, which extends upwardly beside the driver's seat and by means of which said gear T may be rotated. The shaft R, R¹ is provided with universal joints r, r¹, one near the change-speed-casing, and the other near the gear S.

The operation of the device is as follows: It is obvious that when the beveled gear T is rotated by means of the operating lever U the operating shaft R, R¹ will be rotated and the shifting fork N will be moved longitudinally along the threaded part of the section R, thereby moving the gears J, K, L longitudinally on the motor-shaft. The direction in which these gears are moved depends upon that in which the lever U is moved, as will be understood. Accordingly the gears may be shifted in order to change the speed through the rotation of the operating shaft R, R¹. During this rotary action of the shaft the movement imparted to the shifting fork and gears will not be affected by the relative positions of the change-speed-casing, which is supported on the rear axle, and the operating lever, which is mounted on the car-frame. The universal joints r, r¹ together with the telescopic shafts compensate for the disalinement brought about by the motion of the car-frame on the springs.

By the arrangement described not only is the shifting of the gears made very positive but it can also be determined into exactly what position the operating lever should be moved in order to produce the required movement of the gears and consequently the proper meshing and unmeshing of the gears can at all times be obtained.

Having thus described my invention, I claim as new and desire to secure by Letters Patent:

1. In speed-changing mechanism for automobiles having transmission gears supported by the rear axle thereof, the combination, with a motor-shaft arranged at right angles to the rear axle and gears slidable on said motor-shaft to coöperate with said transmission gears, of a shifting fork for said motor-shaft gears, and a rotary extensible operating shaft parallel to the motor-shaft by which said shifting fork is operated.

2. In speed-changing mechanisms for automobiles, the combination with a motor-shaft and the gears slidable thereon, of a shifting fork for said gears, and an extensible operating shaft upon which the said shifting fork is threaded.

3. In speed-changing mechanisms for automobiles, the combination with a motor-shaft and the gears slidable thereon, of a shifting fork for said gears, and an operating shaft composed of two telescopic sections and upon which said shifting fork is threaded.

4. In speed-changing mechanisms for automobiles, the combination with a motor-shaft and the gears slidable thereon, of a shifting fork for said gears, and a rotary longitudinally-extensible universally-jointed operating device for said fork.

5. The combination, with a motor-shaft having speed-changing gears slidable thereon, of a telescopically arranged operating shaft having a threaded section, a shifting fork for said gears threaded on said section, and means whereby said shaft may be manually rotated.

6. In a speed-changing mechanism having gears, a shifting fork for said gears, a rotary extensible rod threaded within said fork, a beveled gear at one end of said rod, a second beveled gear meshing with said first-named gear, a shaft for said second gear, and an operating lever on said shaft.

In testimony, that he claims the foregoing as his invention, he has signed his name in presence of two subscribing witnesses.

FRED. J. ZIEGLER.

Witnesses:
 LOUIS LANDE,
 C. P. GOEPEL.